UNITED STATES PATENT OFFICE.

MAX MAYER, OF KARLSRUHE, GERMANY, AND ADOLF FEHLMANN, OF BASEL, SWITZERLAND.

METHOD OF REMOVING CARBON BISULFID FROM GASES.

No. 926,273.   Specification of Letters Patent.   Patented June 29, 1909.

Application filed January 28, 1909. Serial No. 474,701.

*To all whom it may concern:*

Be it known that we, MAX MAYER, residing at 7 Jahnstrasse, Karlsruhe, Grand Dukedom of Baden, Germany, and ADOLF FEHLMANN, residing at 13 Rosengartenweg, Basel, Switzerland, the former a subject of the German Emperor, the latter a citizen of Switzerland, have invented certain new and useful Improvements in and Relating to Methods of Removing Carbon Bisulfid from Gases, Particularly Coal-Gas, of which the following is a specification.

This invention relates to methods of removing carbon bisulfid from gases; and it comprises a method wherein gases, such as coal gas, are treated with a reactive mixture of a metal oxid and a liquid amin for the production of salts of alkyl dithiocarbamic acids, such salts being subsequently treated to recover the liquid amin; all as more fully hereinafter set forth and as claimed.

The methods now in use for the removal of carbon bisulfid from gases, and particularly coal gas, are relatively slow and ineffective, the reaction between the carbon bisulfid and the purifying agents being relatively slow.

The object of the present invention is to provide a method for the rapid removal of carbon bisulfid and this is done by treating the gas with a mixture of a reactive metal oxid and a liquid amin, other reactive bodies or liquids, such as water, alcohol, acetone, etc., being excluded.

It is desirable in the present invention that there shall be no ionizing, dissolving or diluting reagent present. In lieu of the metal oxid, a salt of such an oxid which is insoluble in the amin employed may be used, but these salts are not desirable for the reason that more of the liquid amin must be used in order to bind the negative radical of such salts. By bringing carbon bisulfid, a reactive metal oxid and a liquid amin into reaction together, under exclusion of other reactive bodies, combination ensues to form a salt of an alkyl dithiocarbamic acid. This salt may be regarded as an intermediate product since it can be again decomposed with the development of sulfureted hydrogen. This intermediate product is formed very rapidly and by the use of the present method the carbon bisulfid of gases may be almost instantly removed, even when it exists in such a proportion as to have a partial pressure of .05 to 0.1 atmosphere. This intermediate product in the presence of an excess of amin slowly reacts with the formation of a substituted thiourea, metal sulfid and sulfureted hydrogen. The formation of sulfureted hydrogen is quantitative. The same obtains where a salt of a metal oxid is used in lieu of the metal oxid itself, if this salt be one which is insoluble in the liquid amin employed. As stated, however, the use of such a salt is not economical, since it requires the employment of more of the liquid amin, and furthermore the reaction, generally, is much slower.

The products obtained from the treatment of the intermediate product produced in removing carbon bisulfid from gas consist essentially of substituted thioureas and other derivatives, such as, for instance, triphenylguanidin and metal sulfids. From these thioureas and derivatives, the liquid amins can be recovered by causing them to react with metal hydroxids, as for instance by heating with hydroxid of iron. The entire reaction mass may be so heated.

As particularly adapted for the purposes of the present invention are the liquid amins of the aliphatic and aromatic groups, such as, for instance the phenylamins, such as anilin, toluidin and xylidin. The oxid employed may be any reactive metal oxid or peroxid, such as for example oxid of mercury, peroxid of lead, minium, lead oxid, oxid of copper, oxid of manganese, hydroxid of iron or oxid of calcium. The salts of these oxids may be employed but are not regarded however as so desirable for the stated reasons.

The reactions taking place in the absorption of the bisulfid proceed according to the following typical equation:

The salts of the alkyl dithiocarbamic acids are slowly decomposed in the presence of an excess of amins forming a sulfid of the metal used, sulfureted hydrogen and substituted thiourea according to the following general equation, the sulfureted hydrogen being formed quantitatively and escaping, to be removed in any suitable manner:

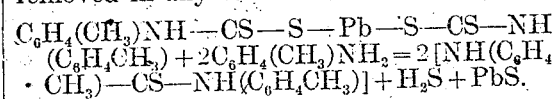

The recovery of the amin from the waste mass produced in the preceding equation with the aid of hydroxid of iron may be effected according to the following general equation:

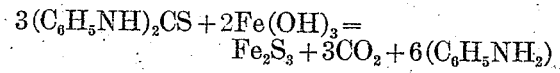

In one specific embodiment of our invention the process may be carried out as follows: A suitable washer is charged with a mixture of finely powdered hydroxid, such as iron hydroxid or limonite and anilin. The mixture may be in the proportions, for instance, of 500 grams of iron hydroxid to 1500 grams of anilin. With these proportions the mixture will be more or less liquid. The gas to be treated is washed with this composition. As the reaction producing the absorption of the carbon bisulfid goes on the mixture becomes thicker because of the formation of the substituted thioureas. Because of this thickening it is necessary either to add further quantities of anilin as the reaction goes on in order to maintain fluidity or to perform the washing operation upon the countercurrent principle in an apparatus adapted to cause the mixture to travel in a direction opposed to that of the direction of gas being treated. After the absorbent powers of the mixture for carbon bisulfid have been satisfied, a waste mass is produced containing thiourea, guanidin and metal sulfids together with unchanged hydroxid of iron. This waste product may be filter pressed and mixed with hydroxid of iron as, for instance in the proportion of 300 parts of the contained thiourea to 200 parts by weight of iron hydroxid. Upon heating this mixture up to about 350° C. about 80 per cent. of the anilin, present in the form of the thiourea, etc. is expelled and may be recovered. The residue remaining in the retort after distillation consists of pyrophoric sulfids of iron and sulfur.

Instead of effecting the purification by the use of a liquid mixed as above described, a solid mixture may be employed, it being merely necessary to increase the proportion of the metal oxid as regards the amin.

In using the described method in gas works, the washer or purifier containing the stated mixture of amins and oxids is preferably located behind the ordinary sulfureted hydrogen purifier or between the third and fourth purifying tanks in the ordinary arrangement.

What we claim is:—

1. The method of removing carbon bisulfid from gas which comprises treating such gas with a mixture composed of a liquid amin and a reactive metal compound.

2. The method of removing carbon bisulfid from gas which comprises treating such gas with a mixture composed of a liquid amin and a metal oxid.

3. The method of removing carbon bisulfid from gas which comprises treating such gas with a mixture composed of anilin and a reactive metal compound.

4. The method of removing carbon bisulfid from gas which comprises treating such gas with a mixture composed of anilin and a metal oxid.

5. The process of removing sulfur from gas which comprises treating gas with a mixture composed of a liquid amin and a reactive metal compound to absorb carbon bisulfid, removing the spent mixture and treating with more amin to cause a liberation of hydrogen sulfid.

6. The process of removing sulfur from gas which comprises treating gas with a mixture composed of a liquid amin and a reactive metal compound to absorb carbon bisulfid, removing the spent mixture, treating with more amin to cause a liberation of sulfureted hydrogen, and heating the product with a metal oxid to recover said amin for re-use.

In testimony whereof we have signed this specification in the presence of two subscribing witnesses.

MAX MAYER.
ADOLF FEHLMANN.

Witnesses:
GEORGE GIFFORD,
ARNOLD T. ZUBER.